United States Patent [19]

Lesher et al.

[11] Patent Number: 4,719,096
[45] Date of Patent: Jan. 12, 1988

[54] CONTINUOUS TWO-STAGE VACUUM PROCESS FOR RECOVERING BROMINE

[75] Inventors: Kenneth C. Lesher; Herbert W. Henry, both of Magnolia, Ark.

[73] Assignee: Ethyl Corporation, Richmond, Va.

[21] Appl. No.: 747,170

[22] Filed: Jun. 20, 1985

Related U.S. Application Data

[63] Continuation-in-part of Ser. No. 622,197, Jun. 19, 1984.

[51] Int. Cl.$^4$ ............................. C01B 7/09; B01D 3/10
[52] U.S. Cl. .................................. 423/504; 202/267 R; 203/31; 203/93; 203/DIG. 25; 423/500
[58] Field of Search ....................... 423/500, 504, 507; 203/29, 31, 92, 93, DIG. 25; 202/84, 91, 99, 158, 267 R

[56] References Cited

U.S. PATENT DOCUMENTS

| | | | |
|---|---|---|---|
| 3,959,450 | 5/1976 | Calloue et al. | 423/507 |
| 4,175,034 | 11/1979 | Thompson | 203/92 |

FOREIGN PATENT DOCUMENTS

| | | | |
|---|---|---|---|
| 56076 | 5/1979 | Japan | 203/DIG. 25 |
| 138890 | 10/1979 | Japan | 423/507 |

OTHER PUBLICATIONS

Encyclopedia of Polymer Science and Technology, vol. 11, p. 65.
Kirk-Othmer Encyclopedia of Chemical Technology, 3rd ed., John Wiley & Sons, vol. 4, pp. 233-236, vol. 7, p. 885.
Chemical Engineers' Handbook, 5th ed., Ed. by Perry & Chilton, McGraw-Hill Book Co. 1973, pp. 23-61, 63.

Primary Examiner—Gregory A. Heller
Assistant Examiner—Jeffrey Edwin Russel
Attorney, Agent, or Firm—Donald L. Johnson; John F. Sieberth; Joseph D. Odenweller

[57] ABSTRACT

A highly efficient continuous process for the winning of bromine from a bromide-containing brine which increases overall bromine recovery efficiency, decreases chlorine requirements, decreases waste-brine neutralization, improves steam recovery, increases capacity and significantly reduces total amount of steam necessary for bromine recovery over prior art. This is accomplished by operating a two-stage subatmospheric apparatus comprising a steaming out tower and a secondary flash chamber. The steaming out or contact tower is operated near the vapor pressure of the feed brine so that only stripping steam is required to remove elemental bromine from the brine. The second stage or secondary flash chamber is operated at a lower pressure than the stage one steaming out tower and enables recovery of bromine, steam and chlorine from the waste bromide-depleted brin or tail brine which might otherwise to be lost. The subatmospheric pressure operation of the two stages also reduces the operating temperature of the process which reduces side reaction effects and thus neutralization requirements prior to disposal of waste brine. Additionally, the overall capacity of the apparatus is greatly increased by reducing steam requiremnts from that required with conventional steaming out towers.

11 Claims, 1 Drawing Figure

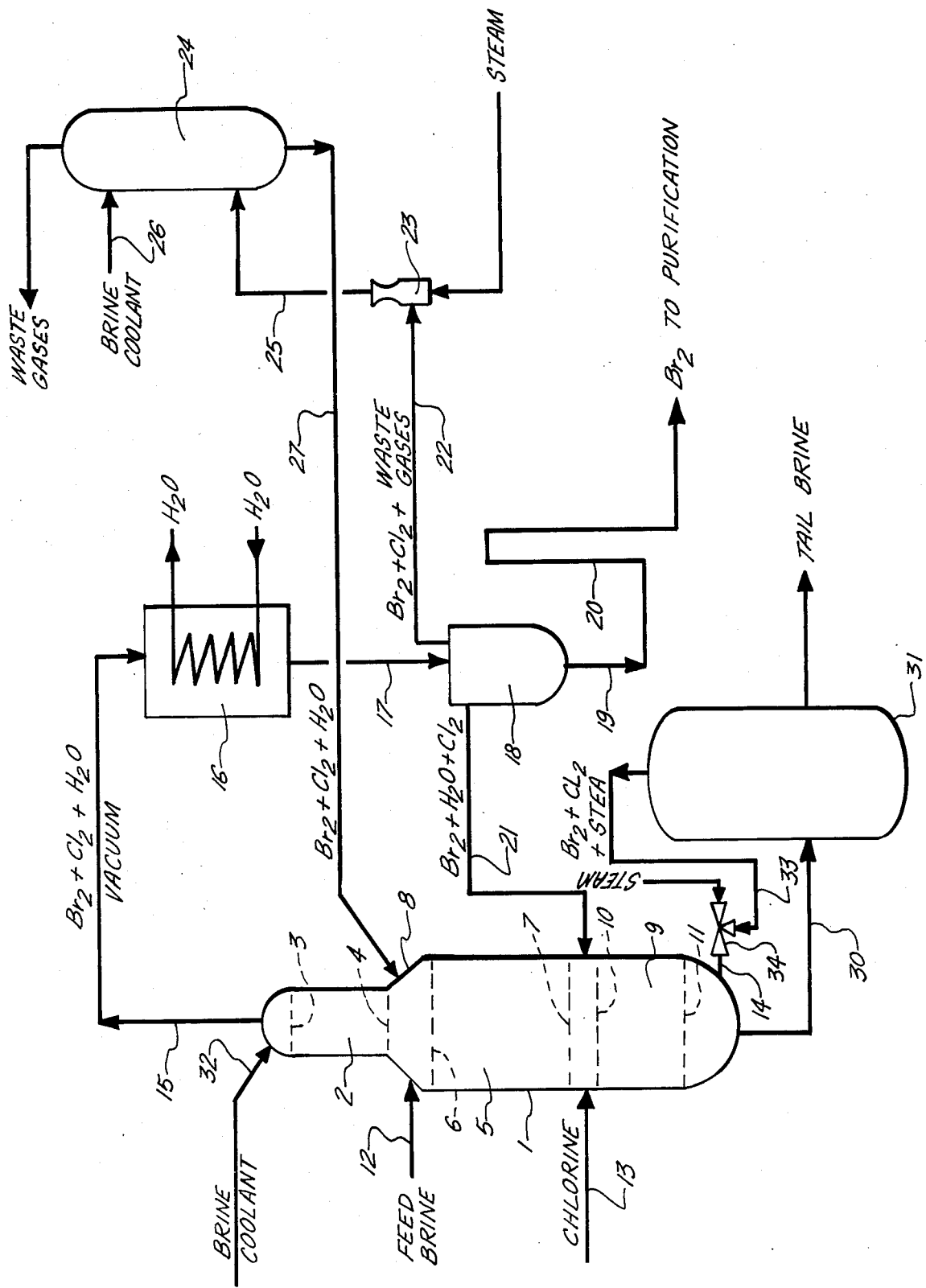

CONTINUOUS TWO-STAGE VACUUM PROCESS FOR RECOVERING BROMINE

BACKGROUND OF THE INVENTION

CROSS REFERENCE TO RELATED APPLICATION

The present application is a continuation-in-part of application Ser. No. 622,197, filed on June 19, 1984.

FIELD OF THE INVENTION

The present invention relates to a highly efficient two-stage continuous process for the extraction of bromine from a bromine-containing brine at subatmosheric pressure whereby bromide-containing brine is contacted with chlorine to obtain free bromine. More particularly, the present invention is directed to a process for the extraction of bromine utilizing chlorine and steam distillation by a two stage subatmospheric or vacuum operation to recover the bromine thus formed from the original bromide-containing brine with a significant reduction in chlorine and steam requirements than that required with conventional steaming out towers. The invention especially relates to the use of a two-stage arrangement employing a contact tower at subatmospheric pressure and reduced temperature to enhance steam, bromine, and chlorine recovery and reduce chlorine consumption in the contact tower by reducing any side reaction effects.

DESCRIPTION OF THE PRIOR ART

In the past, bromine has been produced from bromide containing solutions by the "Kubierscky's distillation method", or a modification thereof. In such method a bromide solution is fed counter-currently in a contact tower, made of granite or similar material. Chlorine gas is fed into a reaction section of the tower, and contacts the bromide solution which is fed from the top of the column. Bromine, which is produced by the reaction, is distilled from the top of the tower by the introduction of steam from the bottom of the tower and then recovered.

Bromine recovery by this method requires a significant amount of steam for preheating the inlet brine to bring the brine to boiling to allow the gaseous bromine produced by the oxidation reaction with the chlorine to be stripped from the solution. The amount of steam required depends upon the temperature of the brine entering the contact tower and the operating pressure.

A chlorination step involving the conversion of bromide to bromine can be accomplished at low temperatures but the brine must be heated up to around 230° F. in a conventional atmospheric steaming out tower in order to steam strip the bromine from the bromide depleted brine after the reaction has taken place. At this temperature, with naturally produced bromide containing brines, the total amount of chlorine needed for conversion is in excess of stoichiometric requirements by approximately 40% because of competing oxidation reactions occurring simultaneously along with the liberation of bromine. These competing reactions occur with compounds found in naturally produced brines and vary with the particular formations and geographic location.

The mixture of water vapor, chlorine and bromine vapor leaving the top of the steaming-out tower is then condensed and the liquid bromine is separated and purified. The bromide depleted brine from the tower bottoms is then neutralized and returned to the formation by deep well injection. This bromide-depleted brine stream typically contains 100–200 ppm unreacted bromide and bromine and excess chlorine which is lost thus reducing the overall efficiency of the tower.

The prior art has utilized various processes for the recovery of bromine. U.S. Pat. No. 4,125,595 discloses a process for producing highly pure bromine from bromide-containing solutions by introducing steam and chlorine counter-current to the heated bromide-containing solution into a column having a reboiler. The reboiler has a liquid and a gaseous zone. Gaseous bromine, chlorine and steam exit the column overhead. About 40 percent to 80 percent of the theoretically needed steam is injected into the lower third of the liquid zone in the reboiler. The remainder of the steam is added depending on the amount of the bromine-chlorine steam mixture withdrawn overhead from the column into the gaseous zone of the reboiler or the lower part of the bromine column.

Another process for the recovery of bromine is disclosed in U.S. Pat. No. 4,031,194. The patent describes a continuous process for the preparation of bromine without loss of bromine from the bottom of the tower by removing bromine from the middle of the tower. The reaction between the chlorine and the brine occurs in the top of the tower. A portion of the free bromine generated by the reaction is heated by exotherm from the reaction and rises and is discharged from the middle of the tower. Steam distillation is used to recover the remaining bromine from the middle section of the tower.

U.S. Pat. No. 3,959,450 discloses a process for producing pure bromine from aqueous hydrobromic acid solutions. A bromide containing mother liquor or sea water concentrate is treated with chlorine to produce pure liquid bromine and bromine dissolved in a liquor portion. The former is separated from the latter and the latter is steam distilled in the presence of chlorine. Crude liquid bromine containing chlorine as an impurity is condensed. The crude liquid bromine is washed and pure liquid bromine separated therefrom and collected.

A conventional steaming out tower can be operated at a pressure and temperature that is mechanically feasible for a particular tower design and type of construction. A conventional steaming out tower for bromine recovery is constructed of granite because of its compatibility with both the natural brines and the bromine. Other materials of construction have been used with various advantages and disadvantages but, as with the granite construction, such conventional towers are operated at atmospheric pressure. It is desirable to operate the tower at the vapor pressure of the bromide-containing brine solution since the brine must be at boiling temperature to allow the gaseous bromine produced by the oxidation reaction with chlorine to be stripped from the solution.

The nearer the tower operating pressure is to the vapor pressure of the incoming brine at its production temperature, the more energy efficient the tower becomes. This is possible since, as the tower pressure is increased above the vapor pressure of the brine, more heat in the form of steam must be added to the brine to bring it to boiling temperature. As the tower pressure is reduced nearer to the vapor pressure of the incoming brine, the heat or steam requirement for boiling is lowered significantly.

Prior art steaming out towers have been limited to an operating pressure of atmospheric pressure or slightly above atmospheric pressure in the range of 14.7–15.0 psia. Atmospheric pressure is the minimum pressure available with prior art tower constructions and designs.

The present invention provides a new apparatus and process which for the first time allows subatmospheric or vacuum operation of a contact tower, thus reducing the operating pressure to approximately that of the incoming brine vapor pressure (6.5–9.0 psia).

SUMMARY OF THE INVENTION

It has now been discovered that a continuous process for the extraction of bromine from a bromide-containing brine may be conducted in high efficiency while dramatically reducing the steam requirement for distillation and the chlorine requirement, has been developed by operating a specially constructed contact tower at subatmospheric pressure. The contact tower is designed to operate near the boiling point of the feed brine so that only stripping steam is needed to remove elemental bromine from the brine.

The present invention utilizes a particular material of construction which is especially useful with the reduced temperatures associated with the subatmospheric pressure operation of the invention.

Conventional towers with brine temperatures of 228°–230° F. do not lend themselves to the use of fiberglass reinforced plastics, e.g. fiberglass reinforced vinylester and fiberglass reinforced polyester. The present invention with its reduced operating temperature of 180°–210° F. permits the use of such materials.

BRIEF DESCRIPTION OF THE DRAWING

The FIGURE is a schematic diagram of the system for a two-stage continuous extraction of bromine according to the invention.

The present invention provides a number of advantages over conventional systems. Amongst which are the following:

(1) up to 80 percent reduction in energy consumption;
(2) a reduction in chlorine required of 12 percent or more;
(3) a reduction in lime required up to about 40 percent;
(4) for a given tower, a capacity increase of up to about 360 percent;
(5) lower maintenance costs;
(6) decreased atmospheric emissions;
(7) reduced injection requirements;
(8) fiberglass tower construction is less costly, provides a variety of shapes, and requires less repair and maintenance than conventional towers. Towers of this invention are stronger, anti-corrosive and leak proof.

DETAILED DESCRIPTION OF THE PREFERRED EMBODIMENTS

A highly energy efficient and improved continuous process for recovering elemental bromine from a bromide-containing or bromide-rich brine, said process comprising:

(a) continuously introducing said bromide-containing or bromide-rich brine into the upper portion of an elongated upright enclosed chamber, designated Stage 1 or first stage;

(b) continuously introducing chlorine into the lower portion of said Stage 1 chamber whereby said chlorine contacts said bromide-containing or bromide-rich brine in a counter current manner;

(c) continuously introducing a relatively very small amount of steam into the bottom section of said Stage 1 chamber to strip bromine from bromide-depleted brine in a counter current manner;

(d) continuously removing gaseous bromine, chlorine and water from the top of said Stage 1 chamber;

(e) continuously condensing the overhead stream of gaseous bromine, chlorine and water vapor;

(f) continuously separating and purifying the bromine to meet commercial specifications;

(g) continuously removing bromide-depleted brine from the bottom of said chamber;

(h) maintaining a vacuum within said chamber;

(i) providing a secondary flashing of steam, chlorine and bromine from bromide-depleted brine in an elongated upright enclosed chamber, designated Stage 2, or second stage by decreasing pressure to an operating pressure below the vapor pressure of the bromide-depleted brine; and, (j) discharging the recovered steam chlorine and bromine from the Stage 2 chamber into said Stage 1 chamber for recovery from top of Stage 1 chamber.

This reduction in tower operating pressure from conventional tower pressure of 14.7–15.0 psia to a tower pressure of 6 to 12 psia, and preferably 6.5–9.0 psia, results in the tower operating temperature dropping from 228°–230° F. to 180°–195° F. Particular benefits obtained with the present invention of a two stage contact tower operating at subatmospheric pressure over that of prior art, are as follows:

(a) a dramatic reduction in the chlorine requirements for bromine recovery by reducing chlorine side reaction effects;

(b) a dramatic reduction in the net steam requirements for distillation by reducing tower pressure and eliminating all steam but stripping steam;

(c) further improvements in steam efficiency by providing an improved secondary steam recovery stage;

(d) improvements in the overall bromine recovery efficiency with a second stage recovery apparatus;

(e) a reduction in the neutralization requirements for the waste bromide-depleted brine over prior art; and, (f) a dramatic increase in capacity over that of the prior art.

Bromide-containing brine is an aqueous solution which is nearly saturated with halide salts. For the purposes of the present invention alternative terminology includes an aqueous solution of a bromide. Bromine may also be produced from hydrobromic acid by the process of the present invention.

Brine is produced in several areas of the United States. Brine solutions typically may contain natural gas, crude oil, hydrogen sulfide, sodium chloride, sodium bromide and other salts. The amount of sodium bromide and the other trace compounds present in the brine depends on the individual formation. For the purposes of the present invention, a brine composition containing sufficient sodium bromide to economically warrant the removal of bromine therefrom is referred to herein as a "bromide-containing" brine.

Preferably the bromide-containing brine feed sources from which the bromine is extracted should be a bromide-rich brine. The latter is defined as one containing 0.1 percent bromide. A brine with bromide in the range of 2000 to 6000 or more parts per million is preferred.

Typical suitable bromine-containing brines have about 3000–5000 parts per million bromide, present as sodium bromide (NaBr), 200,000–250,000 parts per million chloride, present mainly as sodium chloride (NaCl), 150–200 parts per million ammonia (NH$_3$), 100–300 parts per million hydrogen slufide (H$_2$S), 10–20 parts per million sodium iodide (NaI) and additionally may contain some dissolved organics, including natural gas and crude oil.

The bromide-containing brine is first treated to remove natural gas, crude oil and hydrogen sulfide prior to introduction into the contact tower. The bromide-containing brine enters the conventional steaming out contact tower at the top section above the reaction zone. Chlorine is then fed into the contact tower below the reaction zone and above the stripping zone. Chlorine, passing up the tower counter current to the bromide-containing brine which trickles down the tower, reacts with the sodium bromide contained in the brine to reduce sodium chloride and elemental bromine by the well known reaction 2 NaBr+Cl$_2$→2 NaCl+Br$_2$.

A bromide-depleted brine or tail brine is defined as the bromide-containing brine from which the bromide has been substantially removed. Such tail brine typically contains almost 50 to about 200 parts per million bromide.

With conventional steaming out towers operating at atmospheric pressure, bromide depleted brine leaves the tower at its boiling point of 228°–230° F. The tower is provided with sufficient steam to heat the brine from its incoming temperature of 175°–210° F. to a 230° F. exit temperature. Conventional towers are required to be operated at a temperature range of from about 175° to 230° F. for atmospheric operation.

The steam required to bring the bromide-containing brine to boiling is typically supplied by passing motive steam through a vacuum jet designed to recover, by a subatmospheric or vacuum flash, steam from the 230° F. bromide depleted brine or tail brine as it passes through a second stage vessel prior to neutralization and injection back into the underground formation. The jet discharges the recovered steam and the motive steam directly into the tower below the stripping section and countercurrently to the brine flow. A portion of the steam heats the brine to boiling with the remainder of the steam being utilized to strip the previously formed gaseous bromine from the bromide depleted brine. In addition to the recovered steam, bromine and excess chlorine are flashed and recovered along with the steam. This recovered bromine and chlorine are discharged back into the tower along with the steam.

Within the tower there occurs simultaneously and in addition to the primary reaction which produces elemental bromine, chlorine reactions with numerous other trace compounds present in the naturally produced brine solutions. These compounds include NH$_3$, H$_2$S, NaI, and various organic hydrocarbons co-produced with the brine. Concentrations vary with the particular formations from which the brines are produced but typical concentrations are 150–200 ppm NH$_3$, 10–20 ppm NaI, and 100–300 ppm H$_2$S. Side reactions consume 25 percent of the chlorine that is required in a conventional atmospheric steaming out tower to provide 95–96 percent bromide recovery efficiency. The remaining 75 percent of the chlorine liberates the bromine for eventual recovery.

The present invention provides for the operation of a two-stage process utilizing a contact tower under subatmospheric pressure. The first stage comprises the contact tower which is designed to operate near the vapor pressure of the feed brine. The second stage provides a vessel which operates well below the vapor pressure of the bromide depleted brine or tail brine leaving the first stage. Such procedure causes steam to be flashed into the vacuum jet and ultimately returned to the first stage tower for heating and stripping.

The present invention permits significantly reduced pressure and temperatures in the two stages of this invention over those in operating prior art processes.

It has been determined that the higher operating temperature of prior art towers of 228°–230° F. enhances the detrimental side reactions of chlorine. The operating conditions of the present invention reduce the total chlorine requirement by about 10–12 percent, or the chlorine consumed by side reactions by about 40–50 percent. Chlorine utilization with conventional atmospheric steaming out towers range from about 0.55–0.60 lb Cl$_2$/lb Br$_2$ produced. With the instant invention the chlorine utilization is substantially improved to about 0.52–0.53 lbs Cl$_2$/lbs Br$_2$ produced.

The present invention, reduces the rates and selectivity of these side reactions by reducing the tower operating temperature and operating pressure from 228°–230° F. to 180°–195° F. range and from 15 psia to 7–8 psia respectively, and further reduces these reactions by improving contacting within the tower.

In addition to the reduction in chlorine requirements, the subatmospheric pressure operation of this invention of about 6.5–9.0 psia, provides two opportunities for energy efficiency improvements. First the Stage 1 chamber operating at a pressure approximately that of the vapor pressure of the incoming bromide-containing feed brine of about 6.5–9.0 psia, reduces the steam utilization by eliminating the steam previously needed at atmospheric pressure operation to cause the brine to boil enabling the steam stripping of the bromine from the bromide-depleted brine to occur. This invention also provides a method for a second stage vacuum flash of the bromide-deficient brine or tail brine to recover bromide, chlorine and steam previously lost with prior art towers.

A portion of the steam required for conventional atmospheric steaming out towers can be recovered with a vacuum flash of the bromide depleted tail brine as it exists from the tower. This system comprises a vessel designed for a subatmospheric pressure and constructed of suitable materials to be installed on the bromide-depleted brine outlet from the steaming out tower. The brine passes into the flash vessel which is operated at a subatmospheric pressure below the vapor pressure of the brine at the tower exit temperature. The subatmospheric pressure is maintained on this second stage vessel by means of a vacuum jet utilizing steam as the motive fluid. The vacuum jet pulls recovered steam off the bromide depleted brine as it boils and discharges the motive and recovered steam into the bottom section of the tower. The amount of design conditions in the tower and the flash vessel. The vacuum jet design is determined by the total amount of steam required by the steaming out tower, the flash vessel subatmospheric pressure and the steaming out tower pressure. The tower pressure and the flash vessel pressure affect the jet design since the ratio of discharge or tower pressure to suction pressure is the compression ratio for the jet.

The amount of motive steam and the amount of recovered steam depend upon this ratio along with the motive steam pressure. The amount of steam recovered in the flash vessel is largely dependent upon the bromide depleted brine rate through the vessel once the operating pressure is established. As the recovered steam rate is increased additional bromine and chlorine, which are also present in small quantities in the tail brine, are flashed or stripped from the brine along with the steam. The higher the steam flash rate in the second stage, the higher the overall bromine recovery efficiency and chlorine recovery efficiency.

With the present invention the subatmospheric pressure operation of the first stage tower substantially reduces the steam requirements. In a typical operation, steam requirements are reduced from 5.2–5.7 lbs steam/lbs $Br_2$ produced to 1.1–1.4 lbs steam/lb bromine produced. This reduction in steam allows a significant increase, 300–400 percent, in bromine production capacity for the same equivalent tower size. This provides three or four times as much bromide depleted brine for the subatmospheric flash and thus increases the steam recovery rate in the flash vessel. This also improves bromine and chlorine recovery in the vessel.

The subatmospheric flash is further improved with the pressure of the steaming out tower being reduced from 14.7–15.0 psia to approximately 7.0–8.0 psia. This tower pressure reduction represents a decrease in the vacuum jet discharge pressure and a significant improvement in jet performance by allowing the second stage flash vessel to operate at a significantly lower pressure than previously possible. A lower second stage flash operating pressure combined with the higher brine rates of the invention, increases the available flashed or recovered steam by 75–80 percent and at the same time reduces the motive steam by 35–40 percent.

A conventional steaming out tower operating at atmospheric pressure cannot provide a back pressure to the second stage steam ejector that is sufficiently low enough to enhance recovery of steam, bromine and chlorine from the bromide-deficient brine that is available with this invention. In particular, the total bromine recovery efficiency is improved from the 95–96 percent range previously obtained from naturally produced brines to the 97–98 percent range. This is accomplished with the two-stage vacuum chamber apparatus that permits the second stage to boil the bromide deficient brine at a lower pressure than that previously possible. This increases the amount of steam flashed from the brine and greatly improves the recovery of residual bromine and chlorine that is stripped from the brine with the steam.

Contact towers operated at atmospheric pressure are traditionally made of granite. The granite towers are very sensitive to overpressuring during process upsets which frequently occur during normal tower operation. The overpressuring may result in tower granite breakage or gasket damage and potentially could cause the entire tower to collapse.

The contact tower of the present invention is operated under vacuum and can be constructed of any material which can withstand the vacuum without collapsing and which material is not adversely affected by contact with brine, chlorine and bromine. Such materials as metal alloys, carbon steel lined with acid brick and the like are suitable as materials of construction for steaming out towers operated below atmospheric pressure. Towers of these materials would need to be rated to withstand full vacuum service at temperatures up to 230° F.

The apparatus used to conduct the process comprises an upright elongated substantially cylindrical enclosed chamber 1 designated Stage 1 which functions as the contact tower. Chamber 1 includes an upper rectification zone 2 of somewhat smaller diameter than the lower portions of the chamber. Rectification zone 2 is filled with contact packing maintained between perforated retainers 3 and 4. Any suitable contact packing may be used in the practice of the present invention. Typical materials include ceramic, certain metals or various plastics. Below rectification zone 2 is reaction zone 5 which is also filled with contact packing held in position by perforated retainers 6 and 7. Rectification zone 2 is connected to reaction zone 5 by conical section 8.

Stripping zone 9 is located below reaction zone 5 and also contains contact packing. The contact packing is contained between perforated retainers 10 and 11.

Brine conduit 12 enters the space between rectification zone 2 and reaction zone 5 is adapted to distribute feed brine uniformly across the top of retainer 6.

Chlorine feed conduit 13 enters chamber 1 into the space between reaction zone 5 and stripping zone 9. Multiple chlorine feed points are provided to obtain uniform chlorine distribution across the entire chamber cross-section.

Stripping steam is fed through steam conduit 14 to steam nozzles (not shown) which distribute steam across the entire cross-section.

At the top of chamber 1 above rectification zone 2 is suction conduit 15 which connects through condenser 16 and condensate conduit 17 to separator 18 in which bromine separates from an aqueous phase which will be explained hereinafter.

The bottom of separator 18 is drained through bromine conduit 19 which contains a seal loop 20 to control the bromine-water phase separation interface in separator 18. The upper aqueous phase in separator 18 is returned to chamber 1 via recycle conduit 21.

The top of separator 18 is connected through vacuum conduit 22 to steam ejector 23 which is sized to provide a vacuum in chamber 1.

Exhaust steam from ejector 23 is conducted to scrubber 24 via conduit 25. Scrubber 24 is filled with contact packing to provide a high surface area. Cooled bromide-rich feed brine is introduced into the top of scrubber 24 through conduit 26. The bottom of scrubber 24 is connected via drain conduit 27 back to chamber 1.

Tail brine conduit 30 connects the bottom of chamber 1 to an elongated upright enclosed chamber 31 designated as Stage 2.

The top of chamber 31 is connected through vacuum conduit 33 to steam ejector 34 which is sized to provide a vacuum in chamber 31 between 5–8 psia. This pressure is adequate to cause the tail brine to flash steam overhead through conduit 33 to steam ejector 34 and then discharged through conduit 14 directly into chamber 1. The steam flashed in chamber 31 strips bromine and chlorine for recovery back to chamber 1. The efficiency of the steam ejector 34 is greatly improved over that which would be available for conventional towers operating at atmospheric pressure because of chamber 1 being at a subatmospheric pressure of 6.5–9.0 psia. This increases the amount of recovery steam, chlorine and bromine, and improves the overall recovery efficiency of the tower of the invention over conventional steaming out towers.

The temperature of the vapor leaving through suction conduit 15 is controlled by introducing brine coolant through conduit 32 above rectification zone 2. At an operating pressure of about 6.5-9.0 psia the vapor temperature is maintained between 100°-150° F.

In operation, the pressure within chamber 1 is reduced by steam injector 23 which applies suction through vacuum conduit 22, separator 18, condensate conduit 17, condensor 16 and suction conduit 15 to chamber 1 above rectification zone 2. The pressure within chamber 1 is reduced to approximately the vapor pressure of the bromide-rich feed brine. Accordingly the reduced pressure will depend on the temperature of the feed brine which is generally in the range of 180°-210° F.

Bromine-containing feed brine is then introduced through brine feed conduit 12 into the space between rectifier zone 2 and reaction zone 5. The feed brine is uniformly distributed across the entire cross sectional area of the reaction zone. The bromide-containing feed brine then trickles down through the reaction zone.

The foregoing apparatus also includes appropriate valves and seal loops necessary to separate the various sections which are at different pressures.

Concurrently, chlorine is injected into the space between the stripping zone and the reaction zone and distributed uniformly through this space. The chlorine gas moves counter-currently to the feed brine and passes up through the reaction zone wherein it intimately contacts the feed brine trickling through the contact packing. The chlorine reacts with the bromide in the brine and converts the bromide salts to elemental bromine.

The tail brine of bromide-depleted brine containing dissolved bromine then passes down into the stripping zone and trickles through the contact packing in the stripping zone. Steam injected through steam conduit 14 below the stripping zone passes upwardly through the stripping zone and removes a portion of the residual chlorine and bromine from the bromide-depleted brine. The steam stripped bromide-depleted tail brine is then removed from the bottom of chamber 1 through tail brine conduit 30 which conducts the tail brine to chamber 31 wherein it is flashed at a lower pressure as an additional recovery step prior to being neutralized and discharged.

Steam injected through conduit 14 continues upward through stripping zone 9 and reaction zone 5 wherein it vaporizes free bromine which is conducted together with the steam and chlorine up and through rectification zone 2. The overhead temperature is controlled by introducing brine coolant through conduit 32 on the top surface of rectification zone 2. This reduces the temperature of the vapor to minimize the water carry over while still retaining bromine and chlorine in the vapor phase. The gaseous bromine, chlorine and residual steam pass through suction line 15 to condenser 16 where the bromine and water are condensed to the liquid phase. The liquid phase drains through condensate conduit 17 into separator 18 wherein a lower bromine phase and an upper aqueous phase form. The lower bromine phase is drained through bromine conduit 19 and seal loop 20 to a bromine purification system. Seal loop 20 is adjusted such that the aqueous phase does not enter bromine conduit 19 and the aqueous phase containing both chlorine and bromine is conducted through recycle conduit 21 back into chamber 1. The vapor phase in separator 18 is drawn by suction through vacuum conduit 22 into steam injector 23.

The exhaust steam from injector 23 contains bromine and chlorine and is passed into scrubber 24. Brine coolant is introduced through conduit 26 into the top of scrubber 24. Scrubber 24 is filled with a high surface contact packing. Brine passing down through scrubber 24 absorbs bromine and chlorine from the steam injector exhaust and conducts this liquid phase through drain conduit 27 back to chamber 1 for further recovery.

The feed brine is preferably at an elevated temperature. In general, the temperature of feed brine obtained from deep wells, and is in the range of 180°-210° F. The optimum reduced pressure within chamber 1 is that which is equivalent to the vapor pressure of the feed brine at the feed temperature. In general, a reduced pressure of about 6.5-9.0 psia and more often 7-8 psia gives improved results.

The amount of chlorine injected through conduit 13 depends on the total brine feed, the bromide content of the brine, the content of trace compounds which consume chlorine and tower operating conditions. The chlorine should be at least the stoichiometric amount required to oxidize total bromide to bromine. In practice, an excess of about 25 percent or approximately 0.55-0.60 lbs $Cl_2$/lbs $Br_2$ versus the amount of chlorine stoichiometrically equivalent to the bromide present or 0.42-0.44 lbs $Cl_2$/lbs $Br_2$ is needed to maintain a 95-96 percent bromide recovery. The 25 percent excess chlorine is used because of the competing reactions and acidification which occur at conventional atmospheric steaming out tower operating conditions.

The present invention is very energy efficient because the amount of steam required to operate the process is 60-75 percent less than that which would be required to operate a conventional process at atmospheric pressure. At atmospheric pressure, the steam must heat the feed brine up from its wellhead temperature of 180°-210° F. to its boiling point of 228°-230° F. in addition to stripping the bromine from the bromine-containing brine solution. In so doing, a substantial amount of energy is wasted. Accordingly, the present process and apparatus provides a means of conserving considerable energy when recovering bromine from a bromide-containing or bromide-rich brine by eliminating essentially all of the steam normally required except that required for stripping the bromine from the bromide depleted brine or tail brine.

In addition the two-stage vacuum recovery apparatus improves overall bromine recovery and steam recovery by virtue of the second stage jet operating more efficiently since it is able to discharge the recovered bromine, steam, and chlorine directly into the steaming out tower of Stage 1 at an operating pressure of 6.5-9.0 psia versus 14.7-15.0 psia for a conventional steaming out tower. This allows the second stage to pull a deeper vacuum to greatly improve recovery with the same amount of motive or feed steam.

The present invention, also by virtue of its steam requirements being 60-75 percent less than that which would be required to operate a conventional tower, permits the increase of total bromine production by 200-300 percent without increasing the dimensions of the Stage 1 steaming out tower. This is accomplished since the reduction in steam requirements with the sub-atmospheric operation allows the bromide-containing brine flow to be increased substantially without the normal limits or constraints associated with conventional steaming out towers of being able to introduce the tremendously large quantities of steam required for the higher brine capacities. The present invention reduces the net steam requirements from approximately 5.2–5.7 lbs steam/lb $Br_2$ produced to 1.1–1.4 lbs steam/lb $Br_2$ produced. This 60–75 percent reduction in steam allows an increase in bromide-containing brine flow of 200–300 percent since the steam required for this flow will remain essentially the same as that of the conventional tower at lower rates. With the reduced vapor loading in the subatmospheric tower, the liquid rate can be increased if the vapor pressure drop through the column is kept constant.

Very high liquid rates, coupled with low vapor loading, requires the use of certain types of contact packing. The packing must provide very little liquid holdup and minimum vapor pressure drop. This 200–300 percent increase in bromide-containing brine flow and conversely bromine production rate makes the tower of the instant invention substantially more economical than conventional towers since the tower itself does not require enlarging for the capacity increase.

The foregoing disclosure and description of the invention is illustrative and explanatory thereof and various changes in the illustrated apparatus and process may be made within the scope of the appended claims without departing from the spirit of the invention.

What is claimed is:

1. A continuous process for recovering elemental bromine from a bromide-containing brine, said process comprising:
   (a) continuously introducing said bromide-containing brine into the upper portion of a first stage enclosed chamber, said first stage enclosed chamber being an upright fiberglass-reinforced plastic tower;
   (b) continuously introducing chlorine and recovered steam, recovered bromine and recovered chlorine into the lower portion of said first stage enclosed chamber whereby said chlorine contacts said bromide-containing brine in a stripping zone in a counter current manner;
   (c) continuously removing gaseous bromine, chlorine and water from the top of said first stage enclosed chamber;
   (d) maintaining a subatmospheric pressure within said first stage enclosed chamber said subatmospheric pressure being in the range of from about 6 to about 12 psia;
   (e) continuously removing tail brine from the bottom of said first stage enclosed chamber;
   (f) continuously introducing said tail brine into a second stage enclosed chamber;
   (g) maintaining a subatmospheric pressure within said second stage enclosed chamber sufficiently low to cause boiling of said tail brine;
   (h) continuously recovering additional steam, chlorine and bromine not recovered in said stripping section of said first stage enclosed chamber from said second stage enclosed chamber by maintaining a pressure in said second stage enclosed chamber that is less than the vapor pressure of said tail brine in said second stage enclosed chamber; and
   (i) continuously introducing the recovered steam, chlorine and bromine from said second stage enclosed chamber into the bottom of said first stage enclosed chamber.

2. The process of claim 1 wherein said first stage enclosed chamber is an upright elongated fiberglass reinforced plastic tower comprising (a) an upper rectification zone, (b) a central reaction zone, and (c) a lower stripping zone and wherein said bromide-containing brine is introduced between said rectification zone and said reaction zone and said vacuum in said first stage enclosed chamber is maintained by applying a vacuum at the top of said first stage enclosed chamber above said rectification zone thereby drawing off said gaseous bromine, chlorine, and water.

3. The process of claim 2 wherein said bromide-containing brine is introduced into said first stage enclosed chamber at a location between said central reaction zone and said upper rectification zone.

4. The process of claim 3 wherein said chlorine is introduced into said first stage enclosed chamber at a location between said central reaction zone and said lower stripping zone.

5. The process of claim 4 wherein said gaseous bromine, chlorine and water are removed by applying a vacuum at the top of said first stage enclosed chamber above said upper rectification zone thereby drawing off said gaseous bromine and water.

6. The process of claim 5 wherein said steam is introduced below said lower stripping zone thereby stripping residual bromine from said tail brine.

7. The process of claim 2 wherein said steam is recovered from said tail brine from said first stage enclosed chamber by an additional subatmospheric flash in said second stage enclosed chamber at a subatmospheric pressure sufficiently low to cause the tail brine from said first stage enclosed chamber to boil in said second stage enclosed chamber and thereby enable the recovery of stem, chlorine and bromine from the tail brine.

8. The process of claim 2 wherein said first stage enclosed chamber is operated at a subatmospheric pressure sufficiently below atmospheric pressure such that it causes increased recovery of bromine, steam and chlorine from said second stage enclosed chamber.

9. The process of claim 2 wherein gaseous bromine, chlorine and steam are removed from said second stage enclosed chamber by applying a vacuum at the top of said second stage enclosed chamber.

10. The process of claim 9 wherein the steam, chlorine and bromine removed from said second stage enclosed chamber are introduced into the first stage enclosed chamber for recovery.

11. The process of claim 2 wherein said subatmospheric pressure within said first stage enclosed chamber is in the range of from about 6.5 to about 9.0 psia.

* * * * *